(12) United States Patent
Yoshida et al.

(10) Patent No.: US 7,977,830 B2
(45) Date of Patent: Jul. 12, 2011

(54) STRUCTURE FOR MOUNTING VEHICLE DRIVING APPARATUS

(75) Inventors: Tadafumi Yoshida, Nisshin (JP); Masaki Yoshino, Toyota (JP); Yutaka Hotta, Chiryu (JP)

(73) Assignees: Toyota Jidosha Kabushiki Kaisha, Aichi-ken (JP); Aisin AW Co., Ltd., Aichi-ken (JP)

(*) Notice: Subject to any disclaimer, the term of this patent is extended or adjusted under 35 U.S.C. 154(b) by 229 days.

(21) Appl. No.: 12/517,666

(22) PCT Filed: Dec. 26, 2007

(86) PCT No.: PCT/JP2007/075393
§ 371 (c)(1),
(2), (4) Date: Jun. 4, 2009

(87) PCT Pub. No.: WO2008/081984
PCT Pub. Date: Jul. 10, 2008

(65) Prior Publication Data
US 2009/0267427 A1 Oct. 29, 2009

(30) Foreign Application Priority Data
Jan. 4, 2007 (JP) ................ 2007-000133

(51) Int. Cl.
| | |
|---|---|
| H02K 9/19 | (2006.01) |
| H02K 9/193 | (2006.01) |
| H02K 9/197 | (2006.01) |
| B60K 6/26 | (2007.10) |
| B60K 6/405 | (2007.10) |
| B60K 6/44 | (2007.10) |
| B60K 6/22 | (2007.10) |

(52) U.S. Cl. ................ 310/54; 310/52; 310/58
(58) Field of Classification Search .......... 310/52, 310/54, 58, 99; 180/304–308; *H02K 9/19, H02K 9/193, 9/197; B60K 6/405, 9/22*
See application file for complete search history.

(56) References Cited

U.S. PATENT DOCUMENTS

| | | | | |
|---|---|---|---|---|
| 2,030,260 | A | * | 2/1936 | Lewis ................ 310/90 |
| 4,569,639 | A | * | 2/1986 | Hannibal et al. ........... 417/368 |
| 5,380,170 | A | * | 1/1995 | Fain ................ 417/410.5 |
| 5,762,164 | A | * | 6/1998 | Krueger et al. ........... 184/6.18 |
| 5,889,342 | A | * | 3/1999 | Hasebe et al. ............ 310/54 |
| 6,100,615 | A | * | 8/2000 | Birkestrand ............ 310/75 C |
| 6,166,498 | A | * | 12/2000 | Yamaguchi et al. ........... 318/34 |

(Continued)

FOREIGN PATENT DOCUMENTS
JP 3-222649 A 10/1991

(Continued)

*Primary Examiner* — Quyen Leung
*Assistant Examiner* — Terrance Kenerly
(74) *Attorney, Agent, or Firm* — Sughrue Mion, PLLC

(57) ABSTRACT

A mounting structure for a vehicle driving apparatus includes a housing fixed to a vehicle body and including a first internal space and a second internal space formed below the first internal space in the state of being separated from the first internal space; a motor generator provided in the first internal space of the housing; an inverter provided in the second internal space of the housing; and a terminal electrically connecting the motor generator and the inverter. Oil used for cooling the motor generator is stored in the bottom of the first internal space. The portion in the terminal located in the first internal space is located above the highest liquid level of the oil stored in the first internal space.

6 Claims, 4 Drawing Sheets

FRONT SIDE OF VEHICLE ← → REAR SIDE OF VEHICLE

U.S. PATENT DOCUMENTS

| | | | |
|---|---|---|---|
| RE37,019 E * | 1/2001 | Elson | 417/372 |
| 6,201,365 B1 * | 3/2001 | Hara et al. | 318/558 |
| 6,355,996 B1 * | 3/2002 | Birkestrand | 310/54 |
| 7,211,912 B2 | 5/2007 | Takenaka et al. | |
| 7,211,913 B2 * | 5/2007 | Tsutsui et al. | 310/54 |
| 7,528,511 B2 * | 5/2009 | Smith | 310/68 C |
| 2002/0057971 A1 * | 5/2002 | Shida et al. | 417/410.1 |
| 2004/0124332 A1 | 7/2004 | Takenaka et al. | |
| 2004/0226761 A1 | 11/2004 | Takenaka et al. | |
| 2005/0285457 A1 | 12/2005 | Tsutsui et al. | |

FOREIGN PATENT DOCUMENTS

| | | |
|---|---|---|
| JP | 10-248198 A | 9/1998 |
| JP | 2001-238405 A | 8/2001 |
| JP | 2002-316541 A | 10/2002 |
| JP | 2004-215355 A | 7/2004 |
| JP | 2004-343845 A | 12/2004 |
| JP | 2004-357432 A | 12/2004 |
| JP | 2005-83491 A | 3/2005 |
| JP | 2005-117790 A | 4/2005 |
| JP | 2006-14438 A | 1/2006 |

* cited by examiner

← FRONT SIDE OF VEHICLE

REAR SIDE OF VEHICLE →

← FRONT SIDE OF VEHICLE

REAR SIDE OF VEHICLE →

STRUCTURE FOR MOUNTING VEHICLE DRIVING APPARATUS

TECHNICAL FIELD

The present invention relates to a mounting structure for a vehicle driving apparatus, and particularly to a mounting structure for a vehicle driving apparatus in which a rotating electric machine and an electric unit connected to the rotating electric machine are integrated with each other.

BACKGROUND ART

The vehicle driving apparatus has been conventionally known which is structured such that a rotating electric machine and an electric unit electrically connected to the rotating electric machine are integrated with each other.

For example, Japanese Patent Laying-Open No. 10-248198 (Patent Document 1) discloses an inverter-integrated motor in which a motor body is placed on the upper surface of a motor mount and an inverter device is housed within the motor mount.

Similarly, Japanese Patent Laying-Open Nos. 2004-343845 (Patent Document 2), 2004-215355 (Patent Document 3), 2001-238405 (Patent Document 4), and the like disclose a vehicle driving apparatus in which the motor corresponding to a rotating electric machine and the inverter corresponding to an electric unit are integrated with each other.

In the case where the rotating electric machine and the electric unit are integrated with each other as described above, it is preferable to dispose the electric unit below the rotating electric machine in consideration of the maintainability of the electric unit. Furthermore, since the support structure for the driving apparatus is more likely to support the driving apparatus from above or from the side with respect to the driving apparatus, it is also preferable to dispose the above-described electric unit below the rotating electric machine even in consideration of the relationship with the support position by the support structure.

In the case where the electric unit electrically connected to the rotating electric machine is disposed below the rotating electric machine, the connecting terminal on the rotating electric machine side is disposed in the lower portion in the rotating electric machine. In this case, when the cooling medium for cooling the rotating electric machine is stored in the bottom of the housing, the above-mentioned connecting terminal is more likely to be immersed in the cooling medium stored in the bottom. The immersion of the connecting terminal in the cooling medium requires particular measures to be taken in order to ensure the insulation performance in the connecting terminal, which results in an increase in cost.

Patent Documents 1-4 do not disclose the details of the structure of the connecting terminal, and thus, the above-described problems may arise.

DISCLOSURE OF THE INVENTION

An object of the present invention is to provide a mounting structure for a vehicle driving apparatus in which a connecting terminal portion between a rotating electric machine and an electric unit is restrained from being immersed in the cooling medium for cooling the rotating electric machine.

In one aspect, a mounting structure for a vehicle driving apparatus according to the present invention includes a housing including a first internal space and a second internal space formed below the first internal space in the state of being separated from the first internal space; a rotating electric machine provided in the first internal space of the housing; an electric unit provided in the second internal space of the housing; and a connecting portion electrically connecting the rotating electric machine and the electric unit, in which a cooling medium used for cooling the rotating electric machine is stored in the bottom of the first internal space of the housing, and a portion in the connecting portion located in the first internal space of the housing is located above the highest liquid level of the cooling medium stored in the first internal space.

In another aspect, a mounting structure for a vehicle driving apparatus according to the present invention includes a housing fixed to a vehicle body and including a first internal space and a second internal space formed below the first internal space in the state of being separated from the first internal space; a rotating electric machine provided in the first internal space of the housing; an electric unit provided in the second internal space of the housing; and a connecting portion electrically connecting the rotating electric machine and the electric unit, in which a cooling medium used for cooling the rotating electric machine is stored in the bottom of the first internal space of the housing, a portion by which the bottom of the first internal space in the housing is defined includes a portion having a generally planar shape, and the housing is fixed to the vehicle body such that the portion having a generally planar shape is inclined in the direction to which the connecting portion is raised.

According to the above-described configuration, in any of the aspects, the connecting portion can be restrained from being immersed in the cooling medium stored in the bottom of the first internal space of the housing.

It is to be noted that, in the above-described configuration, the first and second internal spaces of the housing may be formed by fixing a plurality of casings each having an internal space to each other, or may be formed by providing a wall partitioning the internal space in one casing.

By way of example, in the above-described mounting structure for the vehicle driving apparatus, the rotating electric machine includes a plurality of phase coils, and the connecting portion includes a plurality of terminals connected to a corresponding phase coil of the plurality of phase coils.

According to the above-described configuration, an electrical short circuit can be restrained from occurring between each of phase terminals connected to their respective phase coils.

By way of example, in the above-described mounting structure for the vehicle driving apparatus, the vehicle driving apparatus includes a differential gear receiving a driving force of the rotating electric machine and rotating to cause the cooling medium stored in the bottom of the first internal space to be stirred up, and the connecting portion is provided on the opposite side of the differential gear with respect to the rotating electric machine.

According to the above-described configuration, the relative liquid level of the cooling medium with respect to the differential gear can be raised and the relative liquid level of the cooling medium with respect to the connecting portion can be lowered. Accordingly, the connecting portion can be restrained from being immersed in the cooling medium while preventing insufficient stirring up of the cooling medium by the differential gear.

According to the present invention, in the vehicle driving apparatus in which the rotating electric machine and the electric unit connected to the rotating electric machine are integrated with each other, it is possible to restrain the connecting terminal portion between the rotating electric machine and the electric unit from being immersed in the cooling medium for cooling the rotating electric machine.

It is to be noted that two or more of the above-described configurations may be combined as appropriate.

BEST MODES FOR CARRYING OUT THE INVENTION

Figure 1:
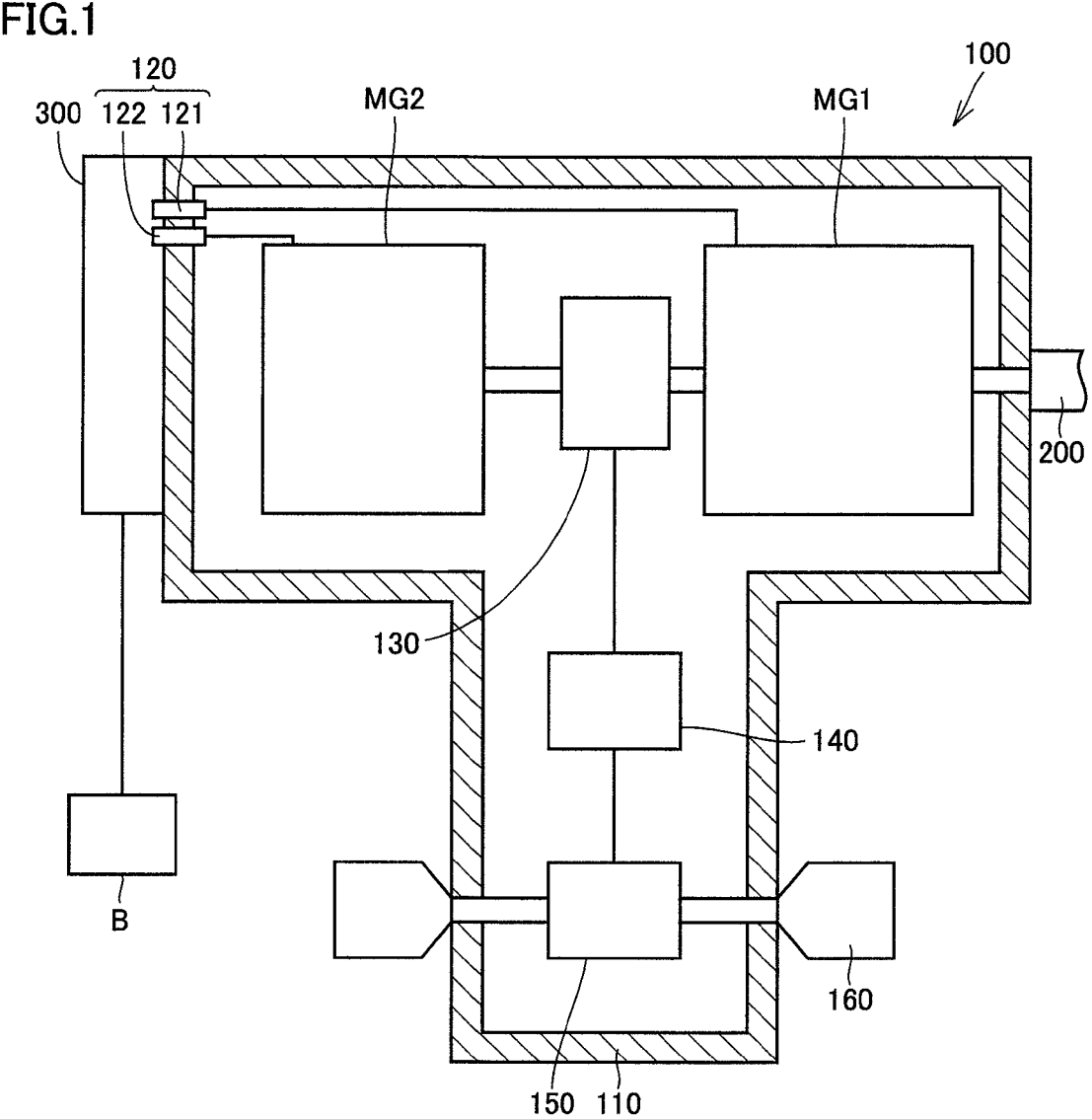
FIG. 1 shows a configuration of a vehicle driving apparatus to which a mounting structure according to one embodiment of the present invention is applied.

The embodiments of the present invention will be hereinafter described. The same or corresponding components are designated by the same reference characters, and description thereof may not be repeated.

In the embodiments described below, when the number, the quantity and the like are mentioned, the scope of the present invention is not necessarily limited thereto unless otherwise specified. Also in the embodiments described below, each component is not necessarily essential to the present invention unless otherwise specified. Furthermore, in the case where there are a plurality of embodiments in the following description, it is originally designed to combine the characteristic portions of each embodiment as appropriate unless otherwise specified.

FIG. 1 shows a configuration of a vehicle driving apparatus to which a mounting structure according to one embodiment of the present invention is applied. Referring to FIG. 1, a driving apparatus 100 serves to drive a hybrid vehicle and is configured to include motor generators MG1 and MG2, a housing 110, a terminal portion 120, a planetary gear 130, a reduction gear 140, a differential gear 150, and a drive shaft receiving portion 160. Motor generators MG1 and MG2, planetary gear 130, reduction gear 140, and differential gear 150 are disposed within housing 110.

Motor generators MG1 and MG2 each correspond to a rotating electric machine having a function of at least one of the electric motor and the electric generator, and each are configured to include a rotation shaft, a rotor fixed to the rotation shaft and a stator.

Planetary gear 130 as a "power split device" includes a sun gear, a ring gear and a planetary carrier (which are not shown). The sun gear in planetary gear 130 is connected to the rotation shaft of motor generator MG1. The ring gear in planetary gear 130 is connected to the rotation shaft of motor generator MG2. The planetary carrier in planetary gear 130 is connected to a shaft 200 through which the power output from the engine is transmitted. The power of the ring gear in planetary gear 130 is then transmitted to reduction gear 140.

Reduction gear 140 is disposed between planetary gear 130 and differential gear 150. Differential gear 150 is connected to a drive shaft via drive shaft receiving portion 160.

Terminal portion 120 includes terminals 121 and 122. Motor generators MG1 and MG2 are connected to a PCU (Power Control Unit) 300 via terminals 121 and 122, respectively, provided in housing 110. PCU 300 is integrated with driving apparatus 100. PCU 300 is electrically connected to a battery B through a cable. This causes battery B to be electrically connected to motor generators MG1 and MG2.

While the hybrid vehicle is running, the power output from the engine is transmitted to a shaft 200 and divided into two paths by planetary gear 130.

One of the above-described two paths corresponds to a path for transmission from reduction gear 140 through differential gear 150 to drive shaft receiving portion 160. The driving force transmitted to drive shaft receiving portion 160 is transmitted as rotating force to the driving wheels through the drive shaft for driving the vehicle.

The other of the paths serves to drive motor generator MG1 for electric power generation. Motor generator MG1 generates electric power by the power of the engine split by planetary gear 130. The electric power generated by motor generator MG1 is variously used in accordance with the running state of the vehicle and the conditions of battery B. For example, at the time of the normal running and the sudden acceleration of the vehicle, the electric power generated by motor generator MG1 is used as electric power for driving motor generator MG2. On the other hand, under the conditions specified for battery B, the electric power generated by motor generator MG1 is stored in battery B through the inverter and the converter that are provided in PCU 300.

Motor generator MG2 is driven by at least one of the electric power stored in battery B and the electric power generated by motor generator MG1. The driving force of motor generator MG2 is transmitted from reduction gear 140 through differential gear 150 to drive shaft receiving portion 160. This allows the driving force of the engine to be assisted by the driving force from motor generator MG2, and also allows the hybrid vehicle to be driven only by the driving force from motor generator MG2.

During regenerative braking of the hybrid vehicle, the driving wheels are rotated by the inertial force of the vehicle body. Motor generator MG2 is driven by the rotating force from the driving wheels through drive shaft receiving portion 160, differential gear 150 and reduction gear 140. At this time, motor generator MG2 operates as an electric generator. Thus, motor generator MG2 serves as a regenerative brake for converting braking energy into electric power. The electric power generated by motor generator MG2 is stored in battery B via the inverter provided within PCU 300.

Figure 2:
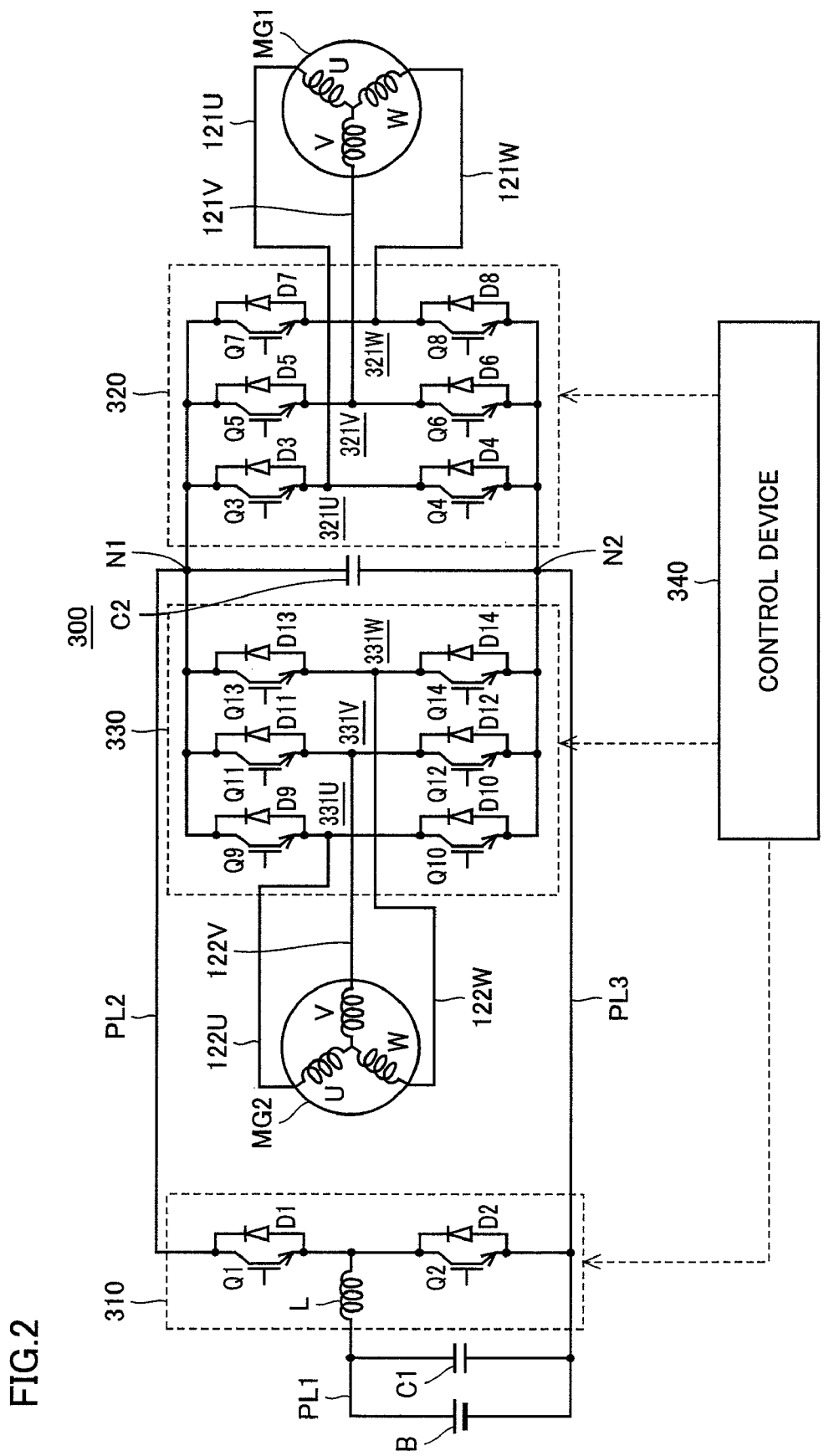
FIG. 2 is a circuit diagram showing the configuration of a main part of a PCU shown in FIG. 1.

FIG. 2 is a circuit diagram showing the configuration of a main part of PCU 300. Referring to FIG. 2, PCU 300 is configured to include a converter 310, inverters 320 and 330, a control device 340, and capacitors C1 and C2. Converter 310 is connected between battery B and inverters 320, 330. Inverters 320 and 330 are connected to motor generators MG1 and MG2, respectively.

Converter 310 includes power transistors Q1 and Q2, diodes D1 and D2, and a reactor L. Power transistors Q1 and Q2 are connected in series and each have a base receiving a control signal from control device 340. Diodes D1 and D2 are connected between the collector and the emitter of each of power transistors Q1 and Q2, respectively, to supply current from the emitter side to the collector side of each of power transistors Q1 and Q2. Reactor L has one end connected to a power supply line PL1 which is connected to the positive electrode of battery B, and has the other end connected to the connecting point between power transistors Q1 and Q2.

Converter 310 uses reactor L to boost the direct-current (DC) voltage received from battery B, and supplies the boosted voltage to a power supply line PL2. Furthermore, converter 310 lowers the DC voltage received from inverters 320 and 330 to charge battery B.

Inverters 320 and 330 include U-phase arms 321U and 331U, V-phase arms 321V and 331V, and W-phase arms 321W and 331W, respectively. U-phase arm 321U, V-phase arm 321V and W-phase arm 321W are connected in parallel between a node N1 and a node N2. Similarly, U-phase arm 331U, V-phase arm 331V and W-phase arm 331W are connected in parallel between node N1 and node N2.

U-phase arm 321U includes two power transistors Q3 and Q4 connected in series. Similarly, U-phase arm 331U, V-phase arms 321V and 331V, and W-phase arms 321W and 331W include two series-connected power transistors of power transistors Q5 to Q14, respectively. Furthermore, diodes D3 to D14 are connected between the collector and the emitter of each of power transistors Q3 to Q14, respectively, to supply current from the emitter side to the collector side.

The intermediate point of each of the phase arms of inverter 320 is connected to the phase end of each of the phase coils of motor generator MG1 through a U-phase terminal 121U, a V-phase terminal 121V and a W-phase terminal 121W, respectively. In motor generator MG1, three coils of the U-, V- and W-phases each have one end connected in common to a neutral point.

Furthermore, the intermediate point of each of the phase arms of inverter 330 is connected to the phase end of each of the phase coils of motor generator MG2 through a U-phase terminal 122U, a V-phase terminal 122V and a W-phase terminal 122W, respectively. In motor generator MG2, three coils of the U-, V- and W-phases each have one end connected in common to a neutral point.

Capacitor C1 is connected between power supply lines PL1 and PL3, and smoothes the voltage level of power supply line PL1. Capacitor C2 is connected between power supply lines PL2 and PL3, and smoothes the voltage level of power supply line PL2.

Based on the drive signal from control device 340, inverters 320 and 330 convert the DC voltage from capacitor C2 into an alternating-current (AC) voltage, to drive motor generators MG1 and MG2.

Control device 340 calculates each phase coil voltage of motor generators MG1 and MG2 based on the motor torque command value, each phase current value of motor generators MG1 and MG2, and the input voltage of inverters 320 and 330, and, based on the calculated results, generates a PWM (Pulse Width Modulation) signal turning on/off power transistors Q3 to Q14 and outputs the same to inverters 320 and 330.

Furthermore, control device 340 calculates a duty ratio of power transistors Q1 and Q2 for optimizing the input voltage of inverters 320 and 330 based on the above-mentioned motor torque command value and the motor rotation speed, and then, based on the calculation results, generates a PWM signal turning on/off power transistors Q1 and Q2 and outputs the same to converter 310.

Furthermore, control device 340 controls the switching operation of power transistors Q11 to Q14 in converter 310 and inverters 320, 330 in order to convert the AC power generated by motor generators MG1 and MG2 into a DC power for charging battery B.

Figure 3:
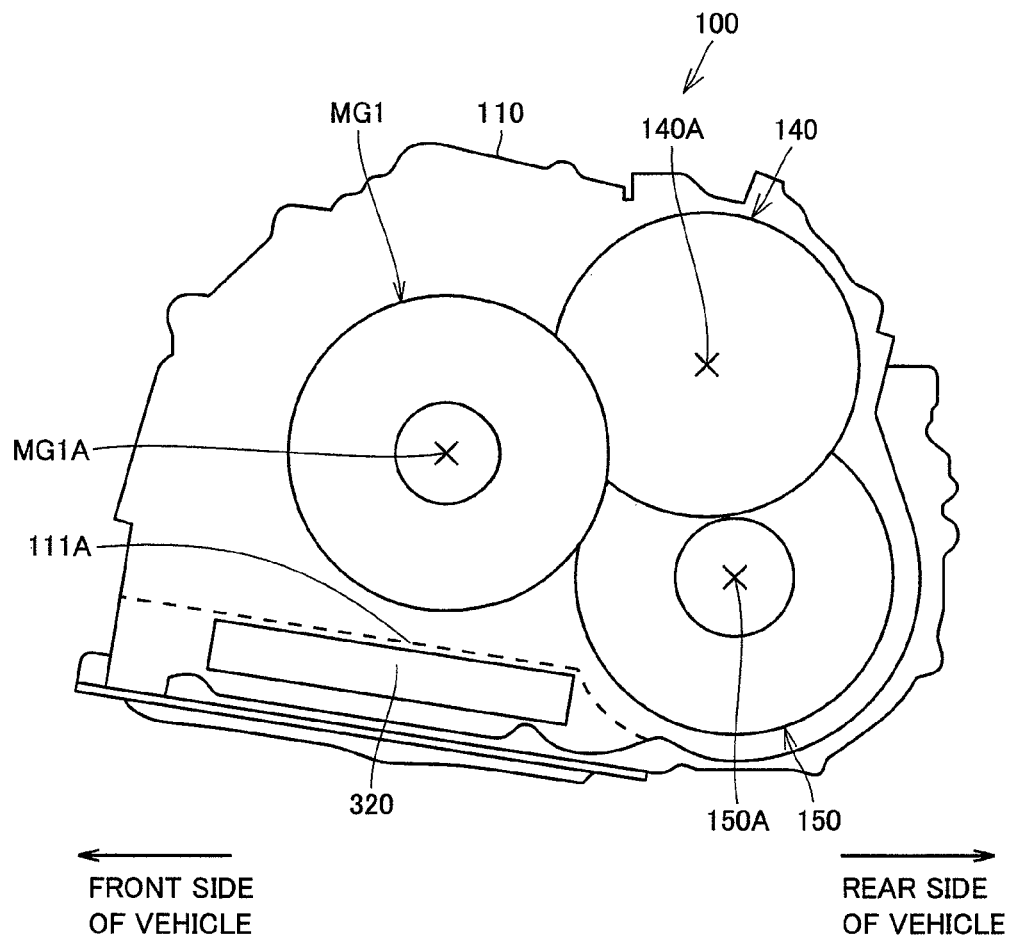
FIG. 3 shows a positional relationship between a rotating electric machine and an inverter in the vehicle driving apparatus shown in FIG. 1.

Then, referring to FIGS. 3 to 5, the structure for mounting driving apparatus 100 to the vehicle will be described. As shown in FIG. 3, in driving apparatus 100, a motor generator axis MG1A corresponding to the rotation axis of motor generator MG1, a reduction gear axis 140A corresponding to the rotation axis of reduction gear 140, and a differential gear axis 150A corresponding to the rotation axis of differential gear 150 are arranged in this order from the front side toward the rear side of the vehicle. It is to be noted that motor generator MG2 is disposed coaxially with motor generator MG1. Inverter 320 electrically connected to motor generator MG1 is disposed below motor generator MG1. Housing 110 accommodating motor generator MG1, reduction gear 140, differential gear 150, and inverter 320 is fixed to the vehicle body such that the front side of the vehicle is raised.

Figure 4:
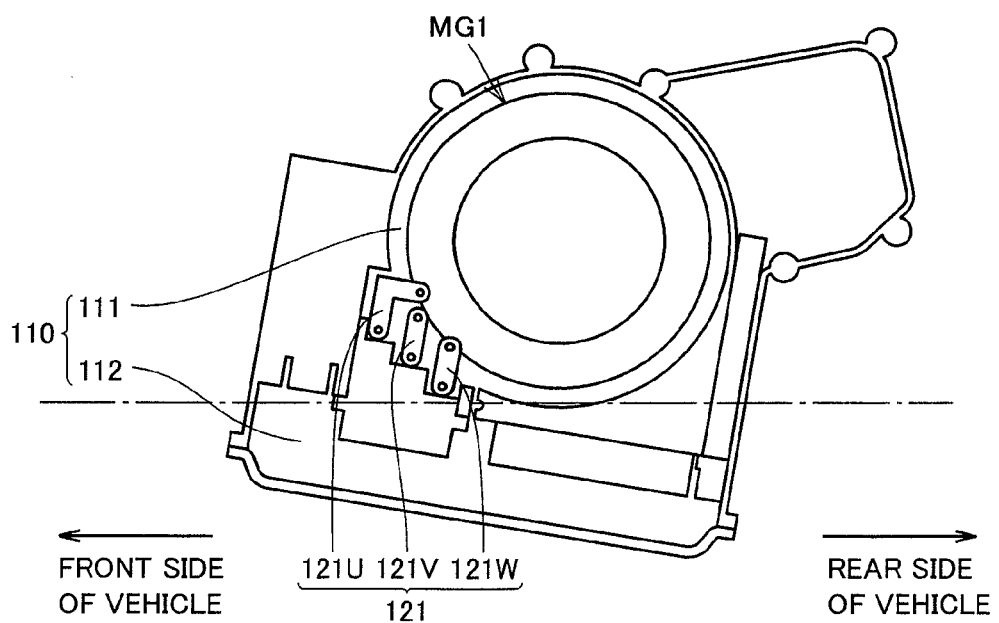
FIG. 4 shows an arrangement of a connecting terminal between the rotating electric machine and the inverter in the vehicle driving apparatus shown in FIG. 1.

Housing 110 includes first and second internal spaces 111 and 112 (see FIG. 4). Motor generator MG1 is provided in first internal space 111 and inverter 320 is provided in second internal space 112. First and second internal spaces 111 and 112 are separated from each other. The portion in the bottom of first internal space 111 located between motor generator MG1 and inverter 320 is defined by a bottom surface 111A having a generally planar shape. Furthermore, oil is stored in the bottom of first internal space 111. By the rotation of the ring gear, differential gear 150 stirs up the oil stored in the bottom of first internal space 111. The oil stirred up by differential gear 150 is supplied to each portion of first internal space 111 and is used, for example, for lubrication and cooling of each portion of motor generator MG1. The oil then returns to the bottom of first internal space 111. In this way, the rotation of differential gear 150 causes the circulation of the oil within first internal space 111. It is to be noted that, as described above, since first and second internal spaces 111 and 112 are separated from each other, the oil circulating through first internal space 111 is not introduced into second internal space 112.

As shown in FIG. 4, terminal 121 is comprised of U-phase terminal 121U, V-phase terminal 121V and W-phase terminal 121W connected to their respective phase coils of motor generator MG1. Terminal 121 is provided in the front side portion in motor generator MG1. In other words, terminal 121 is provided on the opposite side of differential gear 150 with respect to motor generator MG1.

Figure 5:
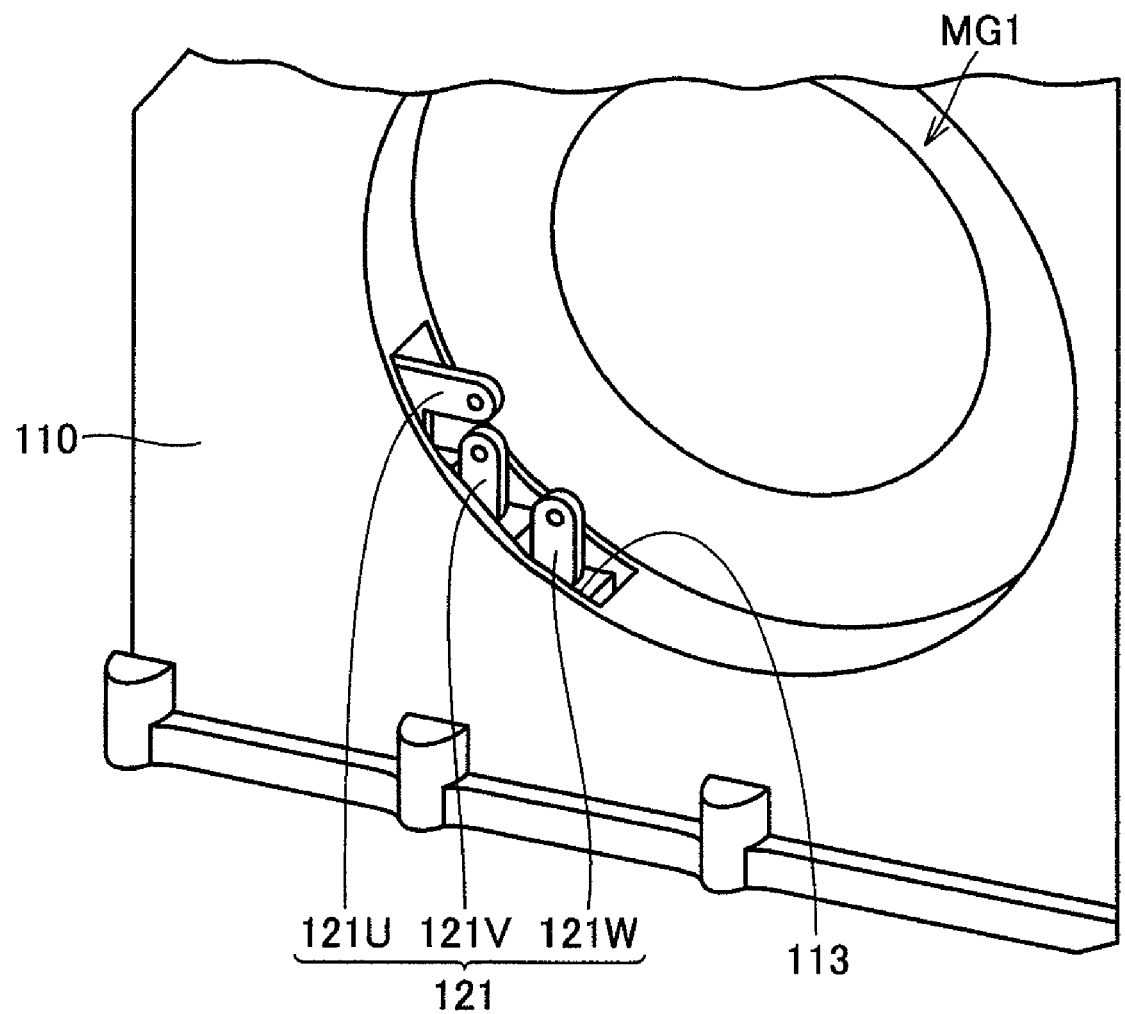
FIG. 5 shows a connecting portion between the rotating electric machine and the connecting terminal shown in FIG. 4.

As shown in FIG. 5, each of phase terminals 121U, 121V and 121W in terminal 121 passes through an opening 113 provided in a separating wall by which the first and second internal spaces are separated from each other, and penetrates this separating wall. The tip of each of the phase terminals extends into first internal space 111. Consequently, it becomes possible to connect, via terminal 121, motor generator MG1 and inverter 320 housed in first and second internal spaces 111 and 112, respectively, which are separated from each other.

As described above, oil is stored in the bottom of first internal space 111. The increase in moisture and metal powder contained in the oil (that is, deterioration of the oil) causes a decrease in insulation performance of the oil. In this case, when the tip of each of phase terminals 121U, 121V and 121W located in first internal space 111 is immersed in the oil, there is concern that an electrical short circuit may occur between each of phase terminals 121U, 121V and 121W, or that an electric short circuit may occur between housing 110 and each of phase terminals 121U, 121V, 121W.

In driving apparatus 100 according to the present embodiment, housing 110 is fixed to the vehicle body while inclining bottom surface 111A of first internal space 111 so as to raise the front side of the vehicle. This allows terminal 121 to be disposed in a relatively higher position with respect to the liquid level of the oil in first internal space 111, with the result that terminal 121 can be restrained from being immersed in the oil.

FIG. 4 shows the highest liquid level of the oil stored in first internal space 111 by the dashed-dotted line. It is to be noted that the liquid level of the oil generally reaches the highest level when driving apparatus 100 does not operate.

According to the mounting structure for the vehicle driving apparatus according to the present embodiment, as described above, housing 110 is fixed to the vehicle body while inclining housing 110 in the direction to which terminal 121 is raised. This causes the portion in terminal 121 located in first internal space 111 of housing 110 to be positioned above the highest liquid level of the oil, with the result that terminal 121 can be restrained from being immersed in the oil.

Furthermore, when housing 110 is fixed such that the front side of the vehicle provided with terminal 121 is relatively raised and the rear side of the vehicle provided with differential gear 150 is relatively lowered, the liquid level of the oil can be kept to some extent in the portion where differential gear 150 is located, and the liquid level of the oil can be lowered in the portion where terminal 121 is located. Therefore, it becomes possible to restrain terminal 121 from being immersed in the oil while keeping the quantity of the oil stirred up by differential gear 150.

The above description is summarized as follows. The mounting structure for the vehicle driving apparatus according to the present embodiment includes housing 110 fixed to the vehicle body and including first internal space 111 and second internal space 112 formed below first internal space 111 in the state of being separated from first internal space 111; motor generator MG1 provided in first internal space 111 of housing 110; inverter 3Z0 as an "electric unit" provided in second internal space 112 of housing 110; and terminal 121 as a "connecting portion" electrically connecting motor generator MG1 and inverter 320. Oil as a "cooling medium" used for cooling motor generator MG1 and the like is stored in the bottom of first internal space 111. Housing 110 is fixed to the vehicle body so as to incline bottom surface 111A of first internal space 111 in the direction to which terminal 121 is raised (that is, the direction to which the front side of the vehicle is raised). The portion in terminal 121 located in first internal space 111 is located above the highest liquid level of the oil stored in first internal space 111.

Although, in the present embodiments, the arrangement of terminal 121 connecting motor generator MG1 and inverter 320 has been mainly described, the concept similar to the above-described arrangement is also applicable to the arrangement of terminal 122 connecting motor generator MG2 and inverter 330.

Furthermore, although the present embodiments have described the example in which terminal 121 is provided on the front side of the vehicle and differential gear 150 is provided on the rear side of the vehicle, the scope of the present invention is not limited thereto. For example, contrary to the above description, terminal 121 may be provided on the rear side of the vehicle and differential gear 150 may be provided on the front side of the vehicle. In this case, housing 110 will be fixed to the vehicle body in the state where housing 110 is inclined so as to raise the rear side of the vehicle.

Although the embodiments of the present invention have been described as above, it should be understood that the embodiments disclosed herein are illustrative and non-restrictive in every respect. The scope of the present invention is defined by the terms of the claims, and is intended to include any modifications within the scope and meaning equivalent to the terms of the claims.

INDUSTRIAL APPLICABILITY

The present invention is applicable, for example, to the mounting structure for the driving apparatus for the hybrid vehicle, and the like.

The invention claimed is:

1. A mounting structure for a vehicle driving apparatus comprising:
    a housing including a first internal space and a second internal space formed below said first internal space in a state of being separated from the first internal space;
    a rotating electric machine provided in the first internal space of said housing;
    an electric unit provided in the second internal space of said housing; and
    a connecting portion electrically connecting said rotating electric machine and said electric unit,
    a cooling medium used for cooling said rotating electric machine being stored in a bottom of the first internal space of said housing, and
    a portion in said connecting portion located in the first internal space of said housing being located above a highest liquid level of said cooling medium stored in the first internal space.

2. The mounting structure for the vehicle driving apparatus according to claim 1, wherein
    said rotating electric machine includes a plurality of phase coils, and
    said connecting portion includes a plurality of terminals connected to a corresponding phase coil of said plurality of phase coils.

3. The mounting structure for the vehicle driving apparatus according to claim 1, wherein
    said vehicle driving apparatus includes a differential gear receiving a driving force of said rotating electric machine and rotating to cause said cooling medium stored in the bottom of said first internal space to be stirred up, and
    said connecting portion is provided on an opposite side of said differential gear with respect to said rotating electric machine.

4. A mounting structure for a vehicle driving apparatus comprising:
    a housing fixed to a vehicle body and including a first internal space and a second internal space formed below said first internal space in a state of being separated from the first internal space;
    a rotating electric machine provided in the first internal space of said housing;
    an electric unit provided in the second internal space of said housing ; and
    a connecting portion electrically connecting said rotating electric machine and said electric unit,
    a cooling medium used for cooling said rotating electric machine being stored in a bottom of the first internal space of said housing,
    a portion by which the bottom of said first internal space in said housing is defined including a portion having a generally planar shape, and
    said housing being fixed to said vehicle body such that said portion having a generally planar shape is inclined in a direction to which said connecting portion is raised.

5. The mounting structure for the vehicle driving apparatus according to claim 4, wherein
    said rotating electric machine includes a plurality of phase coils, and
    said connecting portion includes a plurality of terminals connected to a corresponding phase coil of said plurality of phase coils.

6. The mounting structure for the vehicle driving apparatus according to claim 4, wherein said vehicle driving apparatus includes a differential gear receiving a driving force of said rotating electric machine and rotating to cause said cooling medium stored in the bottom of said first internal space to be stirred up, and said connecting portion is provided on an opposite side of said differential gear with respect to said rotating electric machine.

* * * * *